United States Patent
Zhou et al.

(10) Patent No.: US 10,601,706 B2
(45) Date of Patent: Mar. 24, 2020

(54) GATEWAY CONFIGURATION METHOD AND GATEWAY DEVICE

(71) Applicant: Huawei Technologies Co., Ltd., Shenzhen (CN)

(72) Inventors: Han Zhou, Shanghai (CN); Runze Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/966,783

(22) Filed: Apr. 30, 2018

(65) Prior Publication Data

US 2018/0248792 A1  Aug. 30, 2018

Related U.S. Application Data

(63) Continuation of application No. PCT/CN2015/093467, filed on Oct. 30, 2015.

(51) Int. Cl.
*H04L 12/753* (2013.01)
*H04L 29/08* (2006.01)
(Continued)

(52) U.S. Cl.
CPC ............ *H04L 45/48* (2013.01); *H04L 12/66* (2013.01); *H04L 29/06095* (2013.01); *H04L 29/08036* (2013.01); *H04L 41/044* (2013.01); *H04L 41/0806* (2013.01); *H04L 45/64* (2013.01); *H04L 69/16* (2013.01); *H04L 69/325* (2013.01); *H04L 41/0853* (2013.01)

(58) Field of Classification Search
None
See application file for complete search history.

(56) References Cited

U.S. PATENT DOCUMENTS 8,902,754 B2 * 12/2014 Ali ..................... H04W 76/12
370/235
10,153,942 B2 * 12/2018 Zhang ................ H04L 41/0803
(Continued)

FOREIGN PATENT DOCUMENTS

| CN | 103888289 A | 6/2014 |
|---|---|---|
| CN | 104135378 A | 11/2014 |

(Continued)

*Primary Examiner* — Kevin D Mew
(74) *Attorney, Agent, or Firm* — Leydig, Voit & Mayer, Ltd.

(57) ABSTRACT

Gateway configuration methods and devices that resolve problems of a relatively heavy configuration workload, update inflexibility, and low configuration efficiency that exist when an operation and maintenance (OM) entity is used to uniformly configure gateways in an LTE system. The method includes: configuring, by a control plane gateway, a parameter for a user plane gateway, and sending, by the control plane gateway, a configuration message to the user plane gateway, where the configuration message carries the configuration parameter configured by the control plane gateway for the user plane gateway. The control plane gateway configures the parameter for the user plane gateway, so that the control plane gateway implements configuration of the user plane gateway, and configuration flexibility and configuration efficiency are improved.

16 Claims, 6 Drawing Sheets

(51) Int. Cl.
*H04L 12/66* (2006.01)
*H04L 29/06* (2006.01)
*H04L 12/24* (2006.01)
*H04L 12/715* (2013.01)

(56) References Cited

U.S. PATENT DOCUMENTS

| | | | | |
|---|---|---|---|---|
| 2009/0111458 A1* | 4/2009 | Fox | ............... | H04W 84/042 |
| | | | | 455/422.1 |
| 2009/0122727 A1* | 5/2009 | Gan | ............... | H04W 60/04 |
| | | | | 370/259 |
| 2009/0234956 A1* | 9/2009 | Wang | ............... | H04L 41/048 |
| | | | | 709/228 |
| 2011/0171953 A1* | 7/2011 | Faccin | ............... | H04W 48/08 |
| | | | | 455/426.1 |
| 2013/0013792 A1* | 1/2013 | Norp | ............... | H04W 4/70 |
| | | | | 709/227 |
| 2013/0260810 A1* | 10/2013 | Rayavarapu | ............... | H04W 76/19 |
| | | | | 455/509 |
| 2014/0328298 A1 | 11/2014 | Hooli et al. | | |
| 2015/0052234 A1 | 2/2015 | Hahn | | |
| 2015/0056986 A1* | 2/2015 | Kim | ............... | H04W 8/02 |
| | | | | 455/432.1 |
| 2015/0110095 A1* | 4/2015 | Tan | ............... | H04W 40/02 |
| | | | | 370/338 |
| 2015/0111531 A1* | 4/2015 | Cai | ............... | H04L 12/1403 |
| | | | | 455/406 |
| 2015/0249570 A1* | 9/2015 | Zhang | ............... | H04L 41/0803 |
| | | | | 370/254 |
| 2016/0112945 A1 | 4/2016 | Chen et al. | | |
| 2017/0318452 A1* | 11/2017 | Hahn | ............... | H04W 8/20 |
| 2018/0139129 A1* | 5/2018 | Dowlatkhah | ............... | H04L 45/64 |
| 2018/0255519 A1 | 9/2018 | Benjebbour et al. | | |
| 2018/0343102 A1* | 11/2018 | Sebire | ............... | H04L 5/001 |
| 2019/0075467 A1* | 3/2019 | Mouquet | ............... | H04W 16/02 |

FOREIGN PATENT DOCUMENTS

| | | |
|---|---|---|
| CN | 104185209 A | 12/2014 |
| CN | 104335553 A | 2/2015 |
| CN | 105009521 A | 10/2015 |
| EP | 2854475 A1 | 4/2015 |
| WO | 2013185683 A2 | 12/2013 |
| WO | 2015029729 A1 | 3/2015 |

\* cited by examiner

GATEWAY CONFIGURATION METHOD AND GATEWAY DEVICE

CROSS-REFERENCE TO RELATED APPLICATIONS

This application is a continuation of International Application No. PCT/CN2015/093467, filed on Oct. 30, 2015, the disclosure of which is hereby incorporated by reference in its entirety.

TECHNICAL FIELD

This application relates to the field of wireless communications technologies, and in particular, to a gateway configuration method and a gateway device.

BACKGROUND

In a core network architecture of a long term evolution (LTE) network, a gateway is responsible for processing a user plane packet. A serving gateway (SGW) is mainly responsible for packet processing functions such as data packet routing and forwarding, and further responsible for a control function such as mobility management of user equipment between 3rd Generation Partnership Project (3GPP) and non-3GPP. A packet data network gateway (PGW) is responsible for management of data routing between 3GPP and non-3GPP, and a packet processing function such as dynamic host configuration protocol (DHCP) packet processing, and further responsible for control functions such as policy configuration and charging. The SGW and the PGW may be jointly deployed, or may be separately deployed.

Currently, a hardware upgrade or software upgrade manner is used, and an operation and maintenance (OM) entity of an operator uniformly configures parameters for the SGW and the PGW. In this configuration manner, the OM entity has a heavy configuration workload, especially in a scenario in which a quantity of gateways is greatly increased, for example, the quantity is increased by dozens of times. In addition, during configuration update, the OM entity also needs to uniformly perform configuration update for the SGW and the PGW. Consequently, there is a heavy configuration update workload, and configuration is inflexible.

Therefore, in the manner in which the OM entity is used to uniformly configure gateways, a configuration workload is relatively heavy, update is inflexible, and configuration efficiency is low.

SUMMARY

This application provides a gateway configuration method and a gateway device, so as to resolve problems of a relatively heavy configuration workload, update inflexibility, and low configuration efficiency that exist when an OM entity is used to uniformly configure gateways in an LTE system.

According to a first aspect, a control plane gateway is provided, where the control plane gateway is configured to manage a user plane gateway, and the control plane gateway includes:

a configuration module, configured to configure a parameter for the user plane gateway; and a transceiver module, configured to send a configuration message to the user plane gateway, where the configuration message carries the configuration parameter configured by the configuration module for the user plane gateway.

In a possible implementation, the configuration parameter includes at least one of the following:

an identifier of the control plane gateway, an identifier of at least one communication link configured by the control plane gateway for the user plane gateway, a bandwidth capability corresponding to a communication link, an Internet Protocol (IP) address pool of user equipment served by the user plane gateway, a packet classification rule, a bandwidth management rule, or a congestion management rule.

In a possible implementation, the configuration module is further configured to:

configure the parameter for the user plane gateway after the transceiver module receives a configuration request message sent by the user plane gateway, where the configuration request message is used to request the control plane gateway to configure the parameter for the user plane gateway; or configure the parameter for the user plane gateway after the transceiver module receives a service request message sent by the user equipment, where the user plane gateway is a serving user plane gateway of the user equipment; or configure the parameter for the user plane gateway if load of any user plane gateway managed by the control plane gateway is greater than a specified threshold, where the user plane gateway is the any user plane gateway.

In a possible implementation, if the user equipment is located outside a service range of the user plane gateway configured by the control plane gateway for the user equipment, the configuration module is further configured to: reselect a user plane gateway for the user equipment as the serving user plane gateway of the user equipment, and configure a parameter for the reselected user plane gateway.

In a possible implementation, the configuration request message carries information about the user plane gateway, the information about the user plane gateway includes status information and/or capability information of the user plane gateway, and the configuration module is specifically configured to configure the parameter for the user plane gateway according to the information about the user plane gateway.

In a possible implementation, the status information includes at least one of an identifier of the user plane gateway or a location of the user plane gateway; and the capability information includes at least one of the following: load information or service type information, where the load information is used to indicate a load status of the user plane gateway, and the service type information is used to indicate a service type supported by the user plane gateway.

In a possible implementation, the configuration request message includes at least one object, and the object in the configuration request message includes at least one piece of information in the information about the user plane gateway.

In a possible implementation, the configuration message includes at least one object, each object in the configuration message includes at least one parameter in the configuration parameter and at least one atom action, and the at least one atom action is used to indicate an operation performed on a packet that matches the at least one parameter.

In a possible implementation, the configuration module is further configured to determine the at least one atom action according to a policy and charging control (PCC) rule.

Based on any one of the foregoing implementations, in a possible implementation, the configuration module is further configured to:

after the transceiver module receives a first update request sent by the user plane gateway, update stored information about the user plane gateway, where the first update request carries the information about the user plane gateway, and the information about the user plane gateway includes the status information and/or the capability information; or after the transceiver module receives service information sent by a server, update stored information about the user plane gateway according to the service information, and control the transceiver module to send a second update request to the user plane gateway, where the second update request carries the information about the user plane gateway, and the information about the user plane gateway includes the status information and/or the capability information.

In a possible implementation, the first update request includes at least one object, and the object in the first update request includes at least one piece of information about the user plane gateway; and the second update request includes at least one object, each object in the second update request includes at least one piece of information in the information about the user plane gateway and at least one atom action, and the at least one atom action is used to indicate an operation performed on a packet that matches the at least one piece of information.

In a possible implementation, after updating the stored information about the user plane gateway, the configuration module is further configured to: reconfigure a parameter for the user plane gateway; and control the transceiver module to send a first update response to the user plane gateway, where the first update response includes at least one object, each object in the first update response includes at least one of the configuration parameter and at least one atom action, and the at least one atom action is used to indicate an operation performed on a packet that matches the configuration parameter included in the object.

Based on any one of the foregoing implementations, in a possible implementation, the configuration module is further configured to:

after the transceiver module receives a first release request sent by the user plane gateway, release some or all services of the user plane gateway according to the first release request, and control the transceiver module to return a first release response to the user plane gateway, where the first release response is used to indicate that the control plane gateway completes release of the some or all services of the user plane gateway; or the transceiver module is further configured to: send, under the control of the configuration module, a second release request to the user plane gateway, and receive a second release response returned by the user plane gateway, where the second release request is used to instruct the user plane gateway to release some or all services, and the second release response is used to indicate that the user plane gateway completes release of the some or all services of the user plane gateway.

In a possible implementation, the first release request includes a release parameter of the user plane gateway, an identifier used to indicate a release parameter of the user plane gateway, or an object corresponding to a release parameter of the user plane gateway; and the second release request includes a release parameter of the user plane gateway, an identifier used to indicate a release parameter of the user plane gateway, or an object corresponding to a release parameter of the user plane gateway.

According to a second aspect, a user plane gateway is provided, where the user plane gateway is managed by a control plane gateway, and the user plane gateway includes:

a transceiver module, configured to receive a configuration message sent by the control plane gateway, where the configuration message carries a configuration parameter configured by the control plane gateway for the user plane gateway; and a processing module, configured to store the configuration parameter received by the transceiver module.

For details of the configuration parameter and the configuration message, refer to related description in the first aspect.

In a possible implementation, the processing module is further configured to control the transceiver module to send a configuration request message to the control plane gateway, where the configuration request message is used to request the control plane gateway to configure the parameter for the user plane gateway.

For details of the configuration request message, refer to related description in the first aspect.

Based on any one of the foregoing implementations, in a possible implementation, the processing module is further configured to:

control the transceiver module to send a first update request to the control plane gateway, where the first update request carries information about the user plane gateway, and the information about the user plane gateway includes status information and/or capability information; or after the transceiver module receives a second update request sent by the control plane gateway, update stored information about the user plane gateway according to information carried in the second update request, where the second update request carries information about the user plane gateway, and the information about the user plane gateway includes status information and/or capability information.

The first update request and the second update request are the same as those in the first aspect, and for details, refer to related description in the first aspect.

In a possible implementation, the transceiver module is further configured to receive a first update response sent by the control plane gateway, where the first update response includes at least one object, each object in the first update response includes at least one of the configuration parameter and at least one atom action, and the at least one atom action is used to indicate an operation performed on a packet that matches the configuration parameter included in the object.

In a possible implementation, the processing module is further configured to control the transceiver module to send a first release request to the control plane gateway, and the transceiver module is further configured to receive a first release response returned by the control plane gateway, where the first release request is used to request the control plane gateway to release some or all services of the user plane gateway, and the first release response is used to indicate that the control plane gateway completes release of the some or all services of the user plane gateway; or the processing module is further configured to: after the transceiver module receives a second release request sent by the control plane gateway, release some or all services of the user plane gateway according to the second release request, and control the transceiver module to return a second release response to the control plane gateway, where the second release response is used to indicate that the user plane gateway completes release of the some or all services of the user plane gateway.

The first release request and the second release request are the same as those in the first aspect, and for details, refer to related description in the first aspect.

According to a third aspect, a gateway configuration method is provided, where the method is applied to a communications system, the communications system includes a control plane gateway and a user plane gateway, the control plane gateway is configured to manage the user plane gateway, and the method includes:

configuring, by the control plane gateway, a parameter for the user plane gateway; and sending, by the control plane gateway, a configuration message to the user plane gateway, where the configuration message carries the configuration parameter configured by the control plane gateway for the user plane gateway.

For details of the configuration parameter, refer to related description in the first aspect.

In a possible implementation, the configuring, by the control plane gateway, a parameter for the user plane gateway includes:

configuring, by the control plane gateway, the parameter for the user plane gateway after receiving a configuration request message sent by the user plane gateway, where the configuration request message is used to request the control plane gateway to configure the parameter for the user plane gateway; or configuring, by the control plane gateway, the parameter for the user plane gateway after receiving a service request message sent by user equipment, where the user plane gateway is a serving user plane gateway of the user equipment; or configuring, by the control plane gateway, the parameter for the user plane gateway if load of any user plane gateway managed by the control plane gateway is greater than a specified threshold, where the user plane gateway is the any user plane gateway.

In a possible implementation, the method further includes: if the user equipment is located outside a service range of the user plane gateway configured by the control plane gateway for the user equipment, reselecting, by the control plane gateway, a user plane gateway for the user equipment as the serving user plane gateway of the user equipment, and configuring a parameter for the reselected user plane gateway.

In a possible implementation, the configuration request message carries information about the user plane gateway, and the information about the user plane gateway includes status information and/or capability information of the user plane gateway; and the configuring, by the control plane gateway, a parameter for the user plane gateway includes: configuring, by the control plane gateway, the parameter for the user plane gateway according to the information about the user plane gateway.

For details of the configuration request message, refer to related description in the first aspect.

In a possible implementation, the control plane gateway determines at least one atom action according to a PCC rule.

In a possible implementation, after the sending, by the control plane gateway, a configuration message to the user plane gateway, the method further includes:

receiving, by the control plane gateway, a first update request sent by the user plane gateway, and updating stored information about the user plane gateway, where the first update request carries the information about the user plane gateway, and the information about the user plane gateway includes the status information and/or the capability information; or receiving, by the control plane gateway, service information sent by a server, updating stored information about the user plane gateway according to the service information, and sending a second update request to the user plane gateway, where the second update request carries the information about the user plane gateway, and the information about the user plane gateway includes the status information and/or the capability information.

For details of the first update request and the second update request, refer to related description in the first aspect.

In a possible implementation, after the receiving, by the control plane gateway, a first update request sent by the user plane gateway, and updating stored information about the user plane gateway, the method further includes:

reconfiguring, by the control plane gateway, a parameter for the user plane gateway; and sending, by the control plane gateway, a first update response to the user plane gateway, where the first update response includes at least one object, each object in the first update response includes at least one of the configuration parameter and at least one atom action, and the at least one atom action is used to indicate an operation performed on a packet that matches the configuration parameter included in the object.

Based on any one of the foregoing implementations, in a possible implementation, after the sending, by the control plane gateway, a configuration message to the user plane gateway, the method further includes:

receiving, by the control plane gateway, a first release request sent by the user plane gateway, releasing some or all services of the user plane gateway according to the first release request, and returning a first release response to the user plane gateway, where the first release response is used to indicate that the control plane gateway completes release of the some or all services of the user plane gateway; or sending, by the control plane gateway, a second release request to the user plane gateway, and receiving a second release response returned by the user plane gateway, where the second release request is used to instruct the user plane gateway to release some or all services, and the second release response is used to indicate that the user plane gateway completes release of the some or all services of the user plane gateway.

For details of the first release request and the second release request, refer to related description in the first aspect.

According to a fourth aspect, a gateway configuration method is provided, where the method is applied to a communications system, the communications system includes a control plane gateway and a user plane gateway, the control plane gateway is configured to manage the user plane gateway, and the method includes:

receiving, by the user plane gateway, a configuration message sent by the control plane gateway, where the configuration message carries a configuration parameter configured by the control plane gateway for the user plane gateway; and storing, by the user plane gateway, the configuration parameter.

For details of the configuration parameter and the configuration message, refer to related description in the first aspect.

In a possible implementation, before the receiving, by the user plane gateway, a configuration message sent by the control plane gateway, the method further includes:

sending, by the user plane gateway, a configuration request message to the control plane gateway, where the configuration request message is used to request the control plane gateway to configure the parameter for the user plane gateway.

For details of the configuration request message, refer to related description in the first aspect.

In a possible implementation, after the receiving, by the user plane gateway, a configuration message sent by the control plane gateway, the method further includes:

sending, by the user plane gateway, a first update request to the control plane gateway, where the first update request carries information about the user plane gateway, and the information about the user plane gateway includes status information and/or capability information; or receiving, by the user plane gateway, a second update request sent by the control plane gateway, and updating stored information about the user plane gateway according to information carried in the second update request, where the second update request carries information about the user plane gateway, and the information about the user plane gateway includes status information and/or capability information.

For details of the first update request and the second update request, refer to related description in the first aspect.

In a possible implementation, the method further includes:

receiving, by the user plane gateway, a first update response sent by the control plane gateway, where the first update response includes at least one object, each object in the first update response includes at least one of the configuration parameter and at least one atom action, and the at least one atom action is used to indicate an operation performed on a packet that matches the configuration parameter included in the object.

In a possible implementation, after the receiving, by the user plane gateway, a configuration message sent by the control plane gateway, the method further includes:

sending, by the user plane gateway, a first release request to the control plane gateway, and receiving a first release response returned by the control plane gateway, where the first release request is used to request the control plane gateway to release some or all services of the user plane gateway, and the first release response is used to indicate that the control plane gateway completes release of the some or all services of the user plane gateway; or receiving, by the user plane gateway, a second release request sent by the control plane gateway, releasing some or all services of the user plane gateway according to the second release request, and returning a second release response to the control plane gateway, where the second release response is used to indicate that the user plane gateway completes release of the some or all services of the user plane gateway.

For details of the first release request and the second release request, refer to related description in the first aspect.

According to a fifth aspect, a control plane gateway is provided, where the control plane gateway is configured to manage a user plane gateway, and the control plane gateway includes:

a processor, configured to read a program in a memory, to implement a function of the configuration module in the first aspect, where for details, refer to related description of the configuration module in the first aspect; and a communications interface, configured to implement, under the control of the processor, a function of the transceiver module in the first aspect, where for details, refer to related description of the transceiver module in the first aspect.

According to a sixth aspect, a user plane gateway is provided, where the user plane gateway is managed by a control plane gateway, and the user plane gateway includes:

a processor, configured to read a program in a memory, to implement a function of the processing module in the second aspect, where for details, refer to related description of the processing module in the second aspect; and a communications interface, configured to implement, under the control of the processor, a function of the transceiver module in the second aspect, where for details, refer to related description of the transceiver module in the second aspect.

According to the method and the gateway device provided in this application, the control plane gateway configures the parameter for the user plane gateway, so that the control plane gateway implements configuration of the user plane gateway, and configuration flexibility and configuration efficiency are improved. Because the control plane gateway configures the parameter for the user plane gateway, in a scenario in which user plane gateways are deployed in a distributed manner, even if a quantity of user plane gateways is greatly increased, no large impact is caused on an OM system, and the OM system is prevented from configuring a large amount of service data for each user plane gateway.

DESCRIPTION OF EMBODIMENTS

Technical solutions provided in this application are applied to a distributed gateway (DGW) architecture. In the distributed gateway architecture evolved from an LTE network architecture, functions of a conventional gateway (that is, an SGW and a PGW), for example, a control function and a packet processing function, are split into two independent network elements, that is, a control plane gateway (GW-C) and a user plane gateway (GW-U).

The control plane gateway inherits the control function and logic of the conventional gateway, and is configured to implement functions such as session management and/or data path configuration. The data path configuration function is used to configure a data path for UE. The data path may be a connection or a tunnel that is between a radio access network (RAN) and the GW-U or between the GW-U and another gateway and that is used to forward data of the UE, for example, a General Packet Radio Service (GPRS)_Tunneling Protocol (GTP) tunnel, a Generic Routing Encapsulation (GRE) connection, or a service data flow. The data path may be of a bearer granularity, or may be of a service data flow granularity.

The user plane gateway is configured to implement data or signaling forwarding on a network side and/or data path management, may be a pure data forwarding plane or has only simple control logic, and may further report a stipulated event or an event that cannot be processed to the control plane gateway, process a packet, and so on.

The GW-C may also be referred to as a gateway controller, a control node, or a control gateway. The GW-U may also be referred to as a packet data forwarding gateway, a routing forwarding node, or a switch node.

In addition, the terms "system" and "network" may be used interchangeably in this specification. The term "and/or" herein describes only an association relationship for describing associated objects and represents that three relationships may exist. For example, A and/or B may represent the following three cases: Only A exists, both A and B exist, and only B exists. In addition, the character "/" herein generally indicates an "or" relationship between the associated objects.

Figure 1:
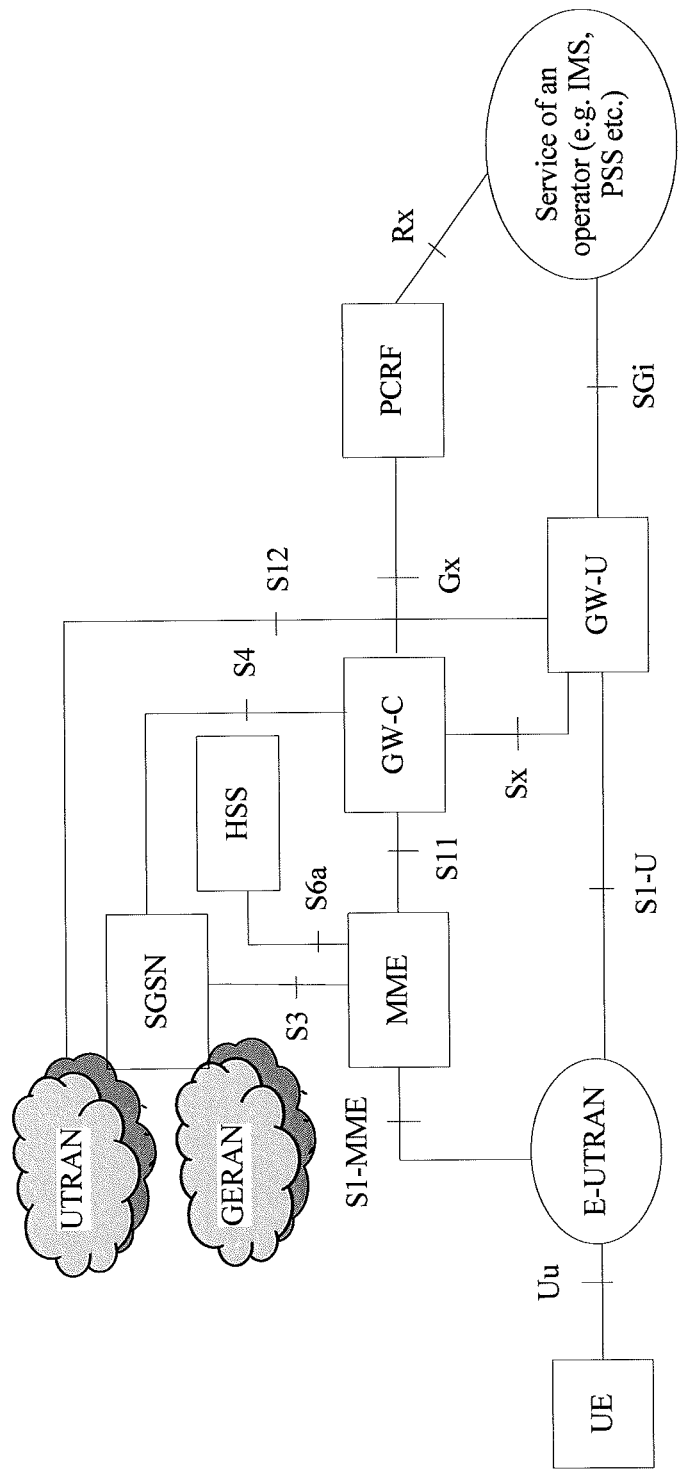
FIG. 1 is a schematic diagram of a network architecture in which a control plane and a user plane of a gateway are separated according to an embodiment of this application.

FIG. 1 provides a network architecture in which a control plane and a user plane of a gateway are separated. User equipment (UE) accesses a wireless communications system shown in FIG. 1 using a radio access network. The radio access network is connected to a mobility management entity (MME)/serving general packet radio service support node (SGSN), and is also connected to a GW-U. A GW-C is connected to the MME/SGSN, and may be configured to perform session management, IP address assignment, and the like. The GW-U is configured to forward user data, forward user data from the radio access network to a packet data network (PDN), and forward user data from the PDN to the radio access network.

Figure 2:
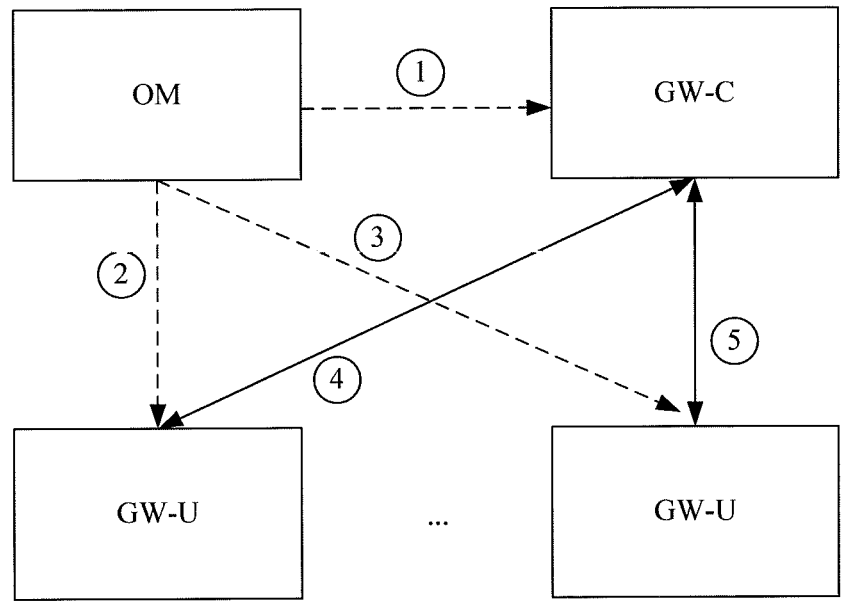
FIG. 2 is a schematic diagram of a connection between a control plane gateway and a user plane gateway according to an embodiment of this application.

It should be noted that a deployment location of the control plane gateway is still similar to that of a conventional gateway, but the user plane gateway is deployed closer to a user, to shorten a transmission delay of user data. The control plane gateway and the user plane gateway may be separately upgraded based on respective different requirements. Functions of another device in a conventional LTE network remain unchanged, and during interaction with the control plane gateway and the user plane gateway, the another device is unaware of whether the control plane gateway and the user plane gateway are gateways in a conventional architecture or gateways in a DGW architecture. In comparison with the conventional gateway, the user plane gateway is deployed closer to a user, and consequently, a coverage area of the user plane gateway becomes smaller. Therefore, a quantity of deployed user plane gateways is increased. In this case, if a manner in which an OM entity uniformly configures gateways in a conventional LTE system is still used, as shown in dashed-line connections ①, ②, and ③ in FIG. 2, a workload of the system is greatly increased. This application provides a method in which the control plane gateway implements configuration of the user plane gateway, as shown in solid-line connections ④ and ⑤ in FIG. 2. The control plane gateway configures a parameter for the user plane gateway, so that the control plane gateway implements configuration of the user plane gateway. Therefore, the user plane gateway can be flexibly configured, and a workload of a system is reduced.

The following further describes the embodiments of this application in detail with reference to drawings of this specification. It should be understood that the embodiments described herein are merely used to describe and explain this application but are not intended to limit this application.

Figure 3:
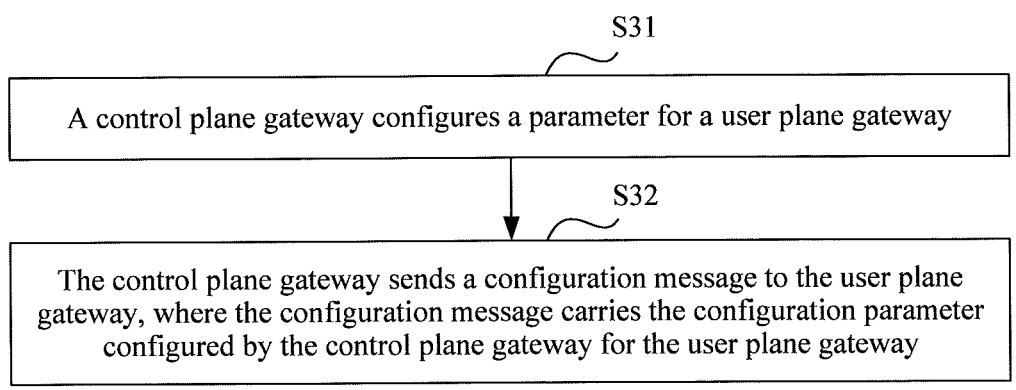
FIG. 3 is a schematic diagram of a gateway configuration method according to an embodiment of this application.

An embodiment of this application provides a gateway configuration method. The method is applied in a communications system. The communications system may include a control plane gateway and a user plane gateway. The control plane gateway is configured to manage the user plane gateway. As shown in FIG. 3, the method may include the following steps.

S31. The control plane gateway configures a parameter for the user plane gateway.

The configuration parameter may include at least one of the following: an identifier of the control plane gateway, an identifier of at least one communication link configured by the control plane gateway for the user plane gateway, a bandwidth capability corresponding to a communication link, an Internet Protocol (IP) address pool of UE served by the user plane gateway, a packet classification rule, a bandwidth management rule, or a congestion management rule.

S32. The control plane gateway sends a configuration message to the user plane gateway, where the configuration message carries the configuration parameter configured by the control plane gateway for the user plane gateway.

In the solution that is provided in this embodiment and in which the control plane gateway implements configuration of the user plane gateway, the control plane gateway configures the parameter for the user plane gateway, so that the control plane gateway implements configuration of the user plane gateway, and configuration flexibility and configuration efficiency are improved. Because the control plane gateway configures the parameter for the user plane gateway, in a scenario in which user plane gateways are deployed in a distributed manner, even if a quantity of user plane gateways is greatly increased, no large impact is caused on an OM system, and the OM system is prevented from configuring a large amount of service data for each user plane gateway.

Optionally, in a first implementation scenario of the foregoing embodiment, the user plane gateway triggers gateway configuration in step S31, which includes:

configuring, by the control plane gateway, the parameter for the user plane gateway after receiving a configuration request message sent by the user plane gateway, where the configuration request message is used to request the control plane gateway to configure the parameter for the user plane gateway.

The configuration request message may carry information about the user plane gateway. The information about the user plane gateway may include status information and/or capability information of the user plane gateway.

The status information may specifically include at least one of an identifier of the user plane gateway or a location of the user plane gateway. The identifier of the user plane gateway may be an IP address of the user plane gateway, and is not limited.

The capability information may specifically include at least one of the following: load information or service type information. For example, the load information may be used to indicate a load status of the user plane gateway, for example, static capacity weight information. The service type information may be used to indicate a service type supported by the user plane gateway, for example, a supported access point name (APN).

Correspondingly, S31 includes that the control plane gateway configures the parameter for the user plane gateway according to the information about the user plane gateway.

Optionally, the configuration request message includes at least one object. The object in the configuration request message includes at least one piece of information in the information about the user plane gateway, that is, the information about the user plane gateway in the configuration request message is classified in an object manner. A parameter of mobility management and/or session management is used as a granularity of an object. An object related to session management may be a user plane gateway controller object, an input interface object, an output interface object, an APN object, or the like. An object related to mobility management may be user plane gateway location information, for example, a tracking area identity (TAI).

For example, a device identity (ID) and an IP address of the user plane gateway are used by the control plane gateway to create a user plane gateway controller object, and the device ID and/or the IP address are/is used as an attribute of the user plane gateway controller object. An interface identifier and a corresponding IP address of the user plane gateway are used by the control plane gateway to create an input interface object, and the interface identifier and/or the IP address are/is used as an attribute of the input interface object. Tracking area (TA) information reported by the user plane gateway is used as an attribute of the user plane gateway controller object. Static capacity weight information reported by the user plane gateway is used as an attribute of the user plane gateway controller object. The control plane gateway creates an output interface object, and uses a device identity of the control plane gateway as the object. Table 1 shows an embodiment of the configuration request message (that is, S18 Setup Request) sent by the user plane gateway to the control plane gateway. This table is merely intended to describe an embodiment of the configuration request message, and is not intended to limit the configuration request message to this embodiment.

TABLE 1

| Message type = Configuration request message | |
|---|---|
| Operate type = Null Attributes Attributes | Object = Input interface Report Report: Interface name Interface IP address UE IP pool name/ID (optional) |
| Operate Type = Null Attributes | Object = Output interface Report: Interface name |
| Operate Type = Null Attributes | Object = GW-U-Controller user plane gateway controller Report: User plane gateway identifier (GW-U ID) Weight Weight Supported atom actions list version Supported tracking area (Support TA) |
| Operate Type = Null Attributes | Object = APN (access point name) Report: APN name |

Information in the attribute information column in the table is information included in the object in the configuration request message.

In the foregoing implementation scenario, if the configuration request message does not carry the information about the user plane gateway, the control plane gateway configures general parameter information for the user plane gateway, for example, an identifier of the control plane gateway, an IP address pool of UE served by the user plane gateway, a packet classification rule, a bandwidth management rule, and a congestion management rule. The IP address pool of the UE served by the user plane gateway, the packet classification rule, the bandwidth management rule, and the congestion management rule may be randomly allocated. If the configuration request message carries the information about the user plane gateway, the control plane gateway may configure parameter information for the user plane gateway based on the information about the user plane gateway. For example, the control plane gateway configures, based on the information about the user plane gateway, an identifier of at least one communication link, a bandwidth capability corresponding to a communication link, an IP address pool of UE served by the user plane gateway, a packet classification rule, a bandwidth management rule, and a congestion management rule for the user plane gateway.

For example, according to location information of the user plane gateway, such as cell information or tracking area information, the control plane gateway configures an IP address pool of UE in an area in which the user plane gateway is located and/or other configuration information for the user plane gateway. For another example, according to the capability information of the user plane gateway, such as information about a served service type or access point name information, the control plane gateway configures link information that can support the service and/or other configuration information for the user plane gateway.

Optionally, after the control plane gateway receives the configuration request message sent by the user plane gateway, the method further includes: storing, by the control plane gateway, the information about the user plane gateway that is carried in the configuration request message.

Optionally, that the control plane gateway stores, in an object manner, the information about the user plane gateway that is carried in the configuration request message is specifically:

generating, by the control plane gateway, at least one list according to the information about the user plane gateway that is carried in the configuration request message, where the at least one list includes at least one object, and the object in the at least one list includes the information about the user plane gateway and/or information about the user plane gateway that is stored in the control plane gateway.

The information about the user plane gateway that is stored in the control plane gateway may be configuration information that is directly configured by another network device, for example, an operator, into the control plane gateway, and the control plane gateway associates the configuration information with the user plane gateway managed by the control plane gateway and stores the configuration information. For example, the configuration information directly configured by the operator into the control plane gateway is that the operator configures that a user plane gateway that supports an APN 1 serves specific UE, and the control plane gateway associates the information with the information about the user plane gateway that is stored in the control plane gateway.

Optionally, in a second implementation scenario of the foregoing embodiment, a service triggers gateway configuration in step S31, which includes:

configuring, by the control plane gateway, the parameter for the user plane gateway after receiving a service request message sent by the user equipment, where the user plane gateway is a serving user plane gateway of the user equipment.

The serving user plane gateway is specifically a user plane gateway that provides a service for the user equipment.

For example, the control plane gateway may configure parameter information for the user plane gateway based on a service initiated by the user equipment, for example, configure a packet tunnel identifier, a packet classification rule, a bandwidth management rule, and a congestion management rule for the user plane gateway based on the service initiated by the user equipment.

Optionally, before the parameter is configured for the user plane gateway, the method further includes: determining the serving user plane gateway of the user equipment in user plane gateways managed by the control plane gateway.

Further, the method may further include:

if the user equipment is located outside a service range of the user plane gateway configured by the control plane gateway for the user equipment, reselecting, by the control plane gateway, a user plane gateway for the user equipment as the serving user plane gateway of the user equipment, and configuring a parameter for the reselected user plane gateway.

Optionally, in a third implementation scenario of the foregoing embodiment, gateway configuration in step S31 is triggered when load of any user plane gateway is greater than a specified threshold, and includes:

configuring, by the control plane gateway, the parameter for the user plane gateway if load of any user plane gateway managed by the control plane gateway is greater than a specified threshold, where the user plane gateway is the any user plane gateway.

In this manner, if the load of the any user plane gateway managed by the control plane gateway is greater than the specified threshold, the control plane gateway transfers services of some user equipment served by the user plane gateway to a user plane gateway whose load is less than or equal to the threshold and that can cover the user equipment, and configures parameters for the user plane gateway in which the some user equipment is located before the services are transferred and the any user plane gateway in which the some user equipment is located after the services are transferred.

Optionally, based on the foregoing embodiment or any implementation scenario of the foregoing embodiment, in a fourth implementation scenario of the foregoing embodiment, the configuration message in step S32 is implemented in a form of "object-list". Details are as follows:

The configuration message may include at least one object, each object in the configuration message includes at least one parameter in the configuration parameter and at least one atom action, and the at least one atom action is used to indicate an operation performed on a packet that matches the at least one parameter.

For example, Table 2 shows an embodiment of the configuration message sent by the control plane gateway to the user plane gateway. This table is merely intended to describe an embodiment of the configuration message, and is not intended to limit the configuration message to this embodiment.

TABLE 2

| Message type = Configuration message | |
| --- | --- |
| Operate type = Modify Attributes Attributes | Object = Input interface |
| | Set SET: |
| | UE IP Pool section |
| | Classification rule (Dscp <-> Internal service level) |
| | Bandwidth management rule (Dscp/ToS/ACL <-> PIR/PBS/CIR/CBS) |
| Action Action | SET: |
| | Packet match (destination IP address) |
| | Object match Object Match (source/destination address) << Link Object ID |
| | Classify Classify (match type: DSCP/ToS/ACL) (optional) |
| | Committed access rate CAR (optional) |
| | Send to (Send To) |
| Operate Type = Modify Attributes | Object = Output interface |
| | SET: |
| | Congestion management/avoidance algorithm |
| | Bandwidth management rule (DSCP/ToS/ACL <-> PIR/PBS/CIR/CBS) |
| | Classification rule (Dscp <-> Internal service level) |
| Action | SET: |
| | Shaping—Shaping |
| | Schedule—Schedule |
| | Marking—Marking |
| Operate Type = Modify Attributes | Object = Link |
| | SET: |
| | Packet Match Type: port number, packet type, tunnel endpoint type |
| | GW-U-C objID—Control plane gateway object identifier |
| | Output interface ObjID—Output interface object identifier |
| Action | Match field -> Link     Match field: Input -> Link |
| | 1. Send To (Output      1. Object Match (match value type 1: |
| | interface ObjID);           Access (Access) (local end tunnel |
| |                               label, match type); 2: Port number and |
| |                               packet type << Bearer ObjID or |
| |                               GW-U-C ObjID |
| |                               2. Send To; |
| Operate Type = Modify | Object = APN |
| | SET: |

TABLE 2-continued

| Message type = Configuration message | |
|---|---|
| Attributes | User profile group |
| | Bandwidth management rule list BWM Rule list |
| Action | |

Information in the attribute information column in the table is information included in the object in the configuration message.

It should be noted that after receiving the configuration message, the user plane gateway stores the object in the configuration message. When a packet is subsequently processed, information in the packet may be first obtained by means of parsing. For example, the packet carries interface information and service type information of the packet. The information in the packet is matched with parameters in stored objects, and if matching succeeds (that is, the information in the packet is the same as a parameter in a stored object), at least one atom action included in the object is performed on the packet. For example, a shaping operation in Table 2 is performed, for example, a packet sending rate is adjusted.

Optionally, before step S32, the method further includes:

determining, by the control plane gateway, the at least one atom action according to a policy and charging control (PCC) rule.

For example, the control plane gateway obtains a PCC rule related to UE, a service, or an application, where the PCC rule includes a charging rule of a packet, a quality of service (QoS) rule of a packet, or the like; determines a parameter in the charging rule as an "object and/or atom action"; and configures the "object and/or atom action" into the user plane gateway.

Certainly, in addition to the foregoing manner in which the at least one atom action is determined according to the PCC rule, the at least one atom action may be determined in another manner, for example, a table searching manner or a preset manner. Details are not described.

Optionally, based on the foregoing embodiment or any implementation scenario of the foregoing embodiment, in a fifth implementation scenario of the foregoing embodiment, after step S32, the method further includes:

receiving, by the control plane gateway, a first update request sent by the user plane gateway, and updating stored information about the user plane gateway, where the first update request carries the information about the user plane gateway, and the information about the user plane gateway includes the status information and/or the capability information; or receiving, by the control plane gateway, service information sent by a server, updating stored information about the user plane gateway according to the service information, and sending a second update request to the user plane gateway, where the second update request carries the information about the user plane gateway, and the information about the user plane gateway includes the status information and/or the capability information.

For example, the control plane gateway may update the stored information about the user plane gateway based on the first update request sent by the user plane gateway; or may independently initiate update of the stored information about the user plane gateway based on the service information sent by the server, and notify the user plane gateway of the second update request for update. The information about the user plane gateway that is stored in the control plane gateway includes the status information/capability information of the user plane gateway, the configuration parameter configured by the control plane gateway for the user plane gateway, and the like.

The control plane gateway updates the stored information about the user plane gateway according to the service information sent by the server. For example, the service information sent by the server may be service information used to indicate that a new type of packet processing logic (a permutation and a combination of existing atom actions) is defined, or service information that carries a new bandwidth management rule. The control plane gateway determines a new "object and/or atom action" for the new packet processing logic, and configures the new "object and/or atom action" into the user plane gateway. The control plane gateway determines a new "object and/or atom action" for the new bandwidth management rule, and configures the new "object and/or atom action" into the user plane gateway.

Optionally, the first update request carries all information about the user plane gateway, that is, the first update request carries updated information and non-updated information about the user plane gateway. Alternatively, the first update request carries updated information in the information about the user plane gateway.

For example, assuming that only the status information of the user plane gateway is updated, the first update request may carry only updated status information of the user plane gateway, or may carry all information about the user plane gateway, including all status information and all capability information.

Optionally, the first update request includes at least one object, and the object in the first update request includes at least one piece of information about the user plane gateway.

Optionally, the second update request carries all information about the user plane gateway, that is, all status information, all capability information, and all configuration parameters of the user plane gateway. Alternatively, the second update request carries updated information in the information about the user plane gateway.

For example, assuming that the control plane gateway updates only the status information of the user plane gateway, the second update request may carry only updated status information of the user plane gateway, or may carry all information about the user plane gateway, including all status information, all capability information, and all configuration parameters.

Optionally, the second update request includes at least one object, each object in the second update request includes at least one piece of information in the information about the user plane gateway and at least one atom action, and the at least one atom action is used to indicate an operation performed on a packet that matches the at least one piece of information.

Further, after the control plane gateway receives the first update request sent by the user plane gateway, and updates the stored information about the user plane gateway, the method may further include:

reconfiguring, by the control plane gateway, a parameter for the user plane gateway; and sending, by the control plane gateway, a first update response to the user plane gateway.

The first update response includes at least one object, each object in the first update response includes at least one of the reconfigured configuration parameter and at least one atom action, and the at least one atom action is used to indicate an operation performed on a packet that matches the configuration parameter included in the object.

For example, the control plane gateway determines, according to updated information about the user plane gateway, whether there is a need to reconfigure parameter information for the user plane gateway. For example, if the user plane gateway no longer supports a capability, the control plane gateway may delete a communication link corresponding to the capability, and may further reconfigure bandwidth capability information corresponding to a current communication link of the user plane gateway. If the user plane gateway supports a new capability, the control plane gateway may configure a corresponding communication link for the capability and identification information of the communication link, and configure bandwidth capability information for the newly configured communication link.

The first update response may carry no information. In this case, the first update response is used to notify the user plane gateway that the control plane gateway completes information update. If the control plane gateway does not reconfigure the parameter for the user plane gateway, the first update response may carry only identification information of the control plane gateway.

Optionally, based on the foregoing embodiment or any implementation scenario of the foregoing embodiment, in a sixth implementation scenario of the foregoing embodiment, after step S32, the method further includes:

receiving, by the control plane gateway, a first release request sent by the user plane gateway, releasing some or all services of the user plane gateway according to the first release request, and returning a first release response to the user plane gateway, where the first release response is used to indicate that the control plane gateway completes release of the some or all services of the user plane gateway; or sending, by the control plane gateway, a second release request to the user plane gateway, and receiving a second release response returned by the user plane gateway, where the second release request is used to instruct the user plane gateway to release some or all services, and the second release response is used to indicate that the user plane gateway completes release of the some or all services of the user plane gateway.

For example, the control plane gateway may determine, based on the first release request sent by the user plane gateway, that there is a need to release the some or all services of the user plane gateway, and release the some or all services; or may determine, based on a policy configured by a server on the control plane gateway (for example, the some or all services of the user plane gateway are released when a quantity of services carried on the user plane gateway is less than a specified threshold), that there is a need to release the some or all services of the user plane gateway, release the some or all services, and notify the user plane gateway of release of the some or all services using the second release request.

For example, when needing to disconnect some or all connections to the control plane gateway because of a reason such as function disabling or restart, the user plane gateway initiates the first release request to the control plane gateway.

After receiving the first release request, the control plane gateway deletes a stored configuration corresponding to the user plane gateway, including a communication link corresponding to a service that needs to be released, identification information of the communication link, bandwidth capability information of the communication link, and the like.

During implementation, the first release request may be a newly defined signaling message, or may be carried in a message that carries a data packet sent by the user plane gateway to the control plane gateway. The second release request may be a newly defined signaling message, or may be carried in a message that carries a data packet sent by the control plane gateway to the user plane gateway.

Optionally, the first release request includes a release parameter of the user plane gateway, an identifier used to indicate a release parameter of the user plane gateway, or an object corresponding to a release parameter of the user plane gateway.

Optionally, if the user plane gateway needs to release all the services, the first release request carries indication information used to indicate to the control plane gateway that the user plane gateway needs to disable all functions.

Optionally, the second release request includes a release parameter of the user plane gateway, an identifier used to indicate a release parameter of the user plane gateway, or an object corresponding to a release parameter of the user plane gateway.

Optionally, if the control plane gateway determines that the user plane gateway needs to release all the services, the second release request carries indication information used to indicate that the user plane gateway needs to disable all functions.

Figure 4:
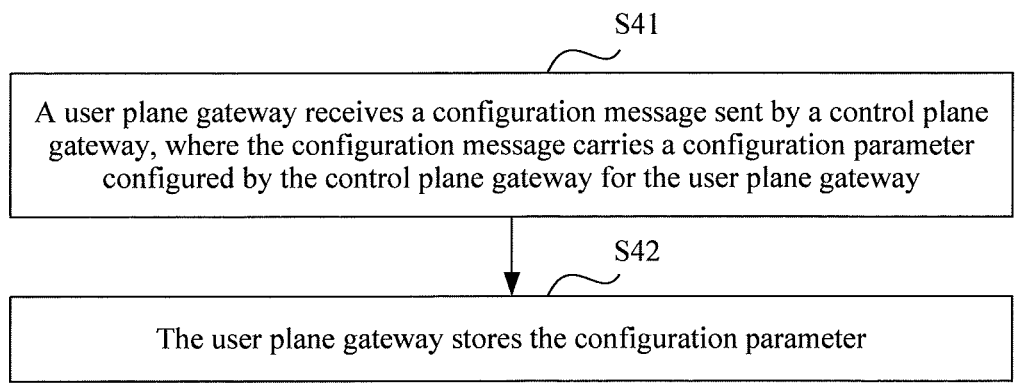
FIG. 4 is a schematic diagram of another gateway configuration method according to an embodiment of this application.

Based on a same inventive concept, an embodiment of this application further provides a gateway configuration method. For content the same as that of a control plane gateway side, refer to related description in the embodiment shown in FIG. 3, and details are not described herein again. As shown in FIG. 4, the method includes the following steps.

S41. A user plane gateway receives a configuration message sent by a control plane gateway, where the configuration message carries a configuration parameter configured by the control plane gateway for the user plane gateway.

For related description of the configuration parameter, refer to step S31.

S42. The user plane gateway stores the configuration parameter.

In the method provided in this embodiment, the user plane gateway receives the parameter configured by the control plane gateway, so that the control plane gateway implements configuration of the user plane gateway, and configuration flexibility and configuration efficiency are improved. Because the control plane gateway configures the parameter for the user plane gateway, in a scenario in which user plane gateways are deployed in a distributed manner, even if a quantity of user plane gateways is greatly increased, no large impact is caused on an OM system, and the OM system is prevented from configuring a large amount of service data for each user plane gateway.

Optionally, in a first implementation scenario of the foregoing embodiment, before step S41, the method further includes:

sending, by the user plane gateway, a configuration request message to the control plane gateway, where the configuration request message is used to request the control plane gateway to configure the parameter for the user plane gateway.

For details of related description of the configuration request message, refer to the embodiment shown in FIG. 3, and details are not described again.

Optionally, in a second implementation scenario of the foregoing embodiment, after step S41, the method further includes:

sending, by the user plane gateway, a first update request to the control plane gateway, where the first update request carries information about the user plane gateway, and the information about the user plane gateway includes status information and/or capability information; or receiving, by the user plane gateway, a second update request sent by the control plane gateway, and updating stored information about the user plane gateway according to information carried in the second update request, where the second update request carries information about the user plane gateway, and the information about the user plane gateway includes status information and/or capability information.

For related description of the first update request and the information about the user plane gateway, refer to the embodiment shown in FIG. 3, and details are not described again.

Optionally, in a third implementation scenario of the foregoing embodiment, after step S42, the method further includes: receiving, by the user plane gateway, a first update response sent by the control plane gateway. The first update response includes at least one object, each object in the first update response includes at least one of the reconfigured configuration parameter and at least one atom action, and the at least one atom action is used to indicate an operation performed on a packet that matches the configuration parameter included in the object.

Optionally, in a fourth implementation scenario of the foregoing embodiment, after step S41, the method further includes:

sending, by the user plane gateway, a first release request to the control plane gateway, and receiving a first release response returned by the control plane gateway, where the first release request is used to request the control plane gateway to release some or all services of the user plane gateway, and the first release response is used to indicate that the control plane gateway completes release of the some or all services of the user plane gateway; or receiving, by the user plane gateway, a second release request sent by the control plane gateway, releasing some or all services of the user plane gateway according to the second release request, and returning a second release response to the control plane gateway, where the second release response is used to indicate that the user plane gateway completes release of the some or all services of the user plane gateway.

It should be noted that for details of explanations of related nouns in the embodiment shown in FIG. 4, refer to the embodiment shown in FIG. 3, and details are not described again.

The following describes gateway configuration methods provided in this application with reference to three specific embodiments and from the perspective of interaction between a user plane gateway and a control plane gateway.

Figure 5:
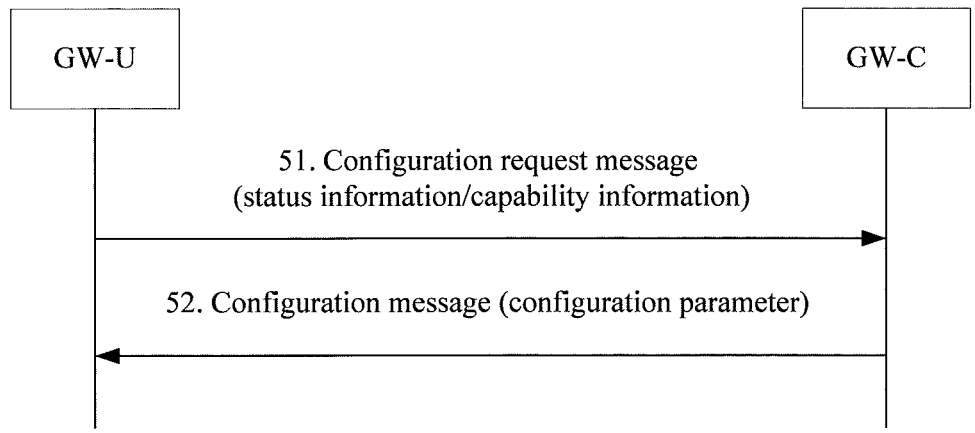
FIG. 5 is a schematic interaction diagram of Embodiment 1 according to an embodiment of this application.

In Embodiment 1, a gateway configuration method is shown in FIG. 5, and the method includes:

51. A user plane gateway sends a configuration request message to a control plane gateway, where the configuration request message carries status information and capability information of the user plane gateway, the status information includes an identifier, location information, and the like of the user plane gateway, and the capability information includes a load status (for example, a static capacity weight) of the user plane gateway, and a status of supporting different service types (for example, supporting which APN).

52. After receiving the configuration request message, the control plane gateway creates a new item if no content item is previously created for the user plane gateway, and stores the identifier of the user plane gateway and information about the user plane gateway (the status information and the capability information). The control plane gateway configures a parameter for the user plane gateway, and sends a configuration message to the user plane gateway. The configuration message includes the configuration parameter configured by the control plane gateway for the user plane gateway, for example, a device identity of the control plane gateway, and a link bandwidth capability of an Sx interface.

Figure 6:
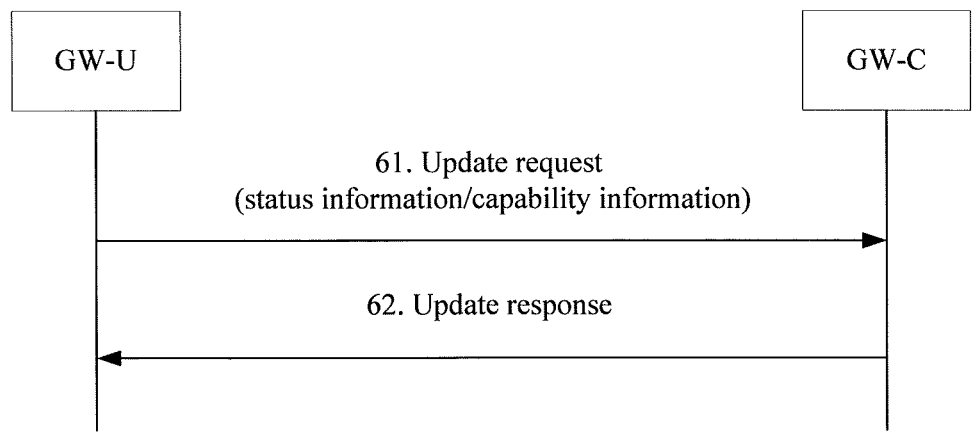
FIG. 6 is a schematic interaction diagram of Embodiment 2 according to an embodiment of this application.

In Embodiment 2, a gateway configuration method is shown in FIG. 6, and the method includes:

61. A user plane gateway sends an update request to a control plane gateway.

The update request may carry all status information and capability information of the user plane gateway. Alternatively, the update request carries only an updated part compared with previously sent information. For example, if location information is changed, but other information remains unchanged, only latest location information needs to be sent to the control plane gateway by using the update request message.

62. After receiving the update request, the control plane gateway finds an item that is previously created for the user plane gateway, and updates, according to information carried in the update request, an identifier of the user plane gateway and information about the user plane gateway (for example, the status information and the capability information) that are previously stored. After completing update, the control plane gateway sends an update response to the user plane gateway.

Figure 7:
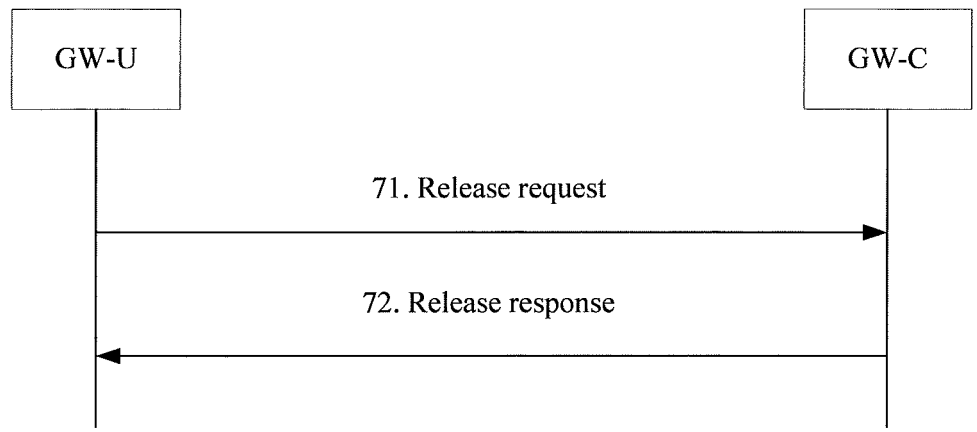
FIG. 7 is a schematic interaction diagram of Embodiment 3 according to an embodiment of this application.

In Embodiment 3, a gateway configuration method is shown in FIG. 7, and the method includes:

71. A user plane gateway sends a release request to a control plane gateway, where the release request carries indication information used to indicate release of all services.

72. After receiving the release request, the control plane gateway finds an item that is previously created for the user plane gateway, and deletes the item or a part of the item. After completing deletion, the control plane gateway sends a release response to the user plane gateway, where the release response carries indication information used to indicate that an Sx connection is successfully released.

for example, if all functions are released, the control plane gateway releases a connection to the user plane gateway, finds one (or more) new user plane gateway(s), and transfers a service on this disabled user plane gateway. If some functions are released, other functions of the control plane gateway and the user plane gateway can still work.

It should be pointed out that the method shown in FIG. 6 or FIG. 7 may be executed based on the method shown in FIG. 5. In addition, for explanations of steps and related nouns in FIG. 5 and FIG. 6, refer to FIG. 3 or FIG. 4, and details are not described again.

Figure 8:
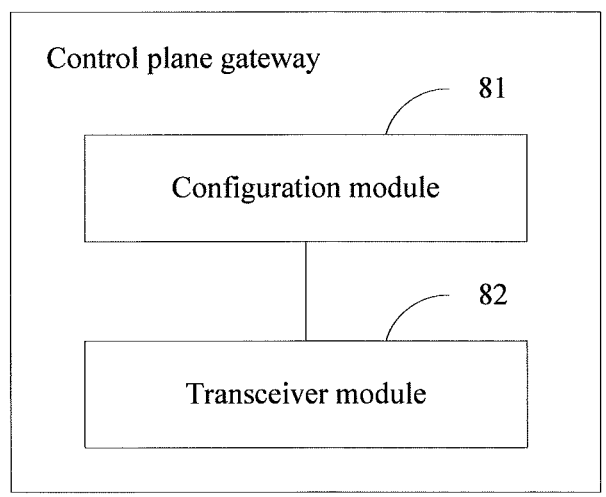
FIG. 8 is a schematic diagram of a control plane gateway according to an embodiment of this application.

Based on a same inventive concept, this application provides a control plane gateway, configured to perform steps performed by the control plane gateway in the foregoing method embodiments. For details, refer to related description in the embodiment shown in FIG. 3. The control plane gateway is configured to manage a user plane gateway. As shown in FIG. 8, the control plane gateway includes:

a configuration module 81, configured to configure a parameter for the user plane gateway; and a transceiver module 82, configured to send a configuration message to the user plane gateway, where the configuration message carries the configuration parameter configured by the configuration module 81 for the user plane gateway.

Optionally, the configuration module 81 is configured to:

configure the parameter for the user plane gateway after the transceiver module 82 receives a configuration request message sent by the user plane gateway, where the configuration request message is used to request the control plane gateway to configure the parameter for the user plane gateway; or configure the parameter for the user plane gateway after the transceiver module 82 receives a service request message sent by user equipment, where the user plane gateway is a serving user plane gateway of the user equipment; or configure the parameter for the user plane gateway if load of any user plane gateway managed by the control plane gateway is greater than a specified threshold, where the user plane gateway is the any user plane gateway.

Optionally, the configuration module 81 is further configured to: if the user equipment is located outside a service range of the user plane gateway configured by the control plane gateway for the user equipment, reselect a user plane gateway for the user equipment as the serving user plane gateway of the user equipment, and configure a parameter for the reselected user plane gateway.

Optionally, the configuration request message carries information about the user plane gateway. The information about the user plane gateway includes status information and/or capability information of the user plane gateway. The configuration module 81 is configured to configure the parameter for the user plane gateway according to the information about the user plane gateway.

For the status information and the configuration request message, refer to related description in the embodiment shown in FIG. 3.

Optionally, the configuration module 81 is further configured to determine at least one atom action according to a PCC rule.

For related description of the atom action and an object, refer to the embodiment shown in FIG. 3.

Optionally, based on any one of the foregoing possible implementations, the configuration module 81 is further configured to:

after the transceiver module 82 receives a first update request sent by the user plane gateway, update stored information about the user plane gateway, where the first update request carries the information about the user plane gateway, and the information about the user plane gateway includes the status information and/or the capability information; or after the transceiver module 82 receives service information sent by a server, update stored information about the user plane gateway according to the service information, and control the transceiver module 82 to send a second update request to the user plane gateway, where the second update request carries the information about the user plane gateway, and the information about the user plane gateway includes the status information and/or the capability information.

For the first update request and the second update request, refer to related description in the embodiment shown in FIG. 3.

Further, after updating the stored information about the user plane gateway, the configuration module 81 is further configured to: reconfigure a parameter for the user plane gateway, and control the transceiver module 82 to send a first update response to the user plane gateway. For the first update response, refer to description in the embodiment shown in FIG. 3.

Optionally, based on any one of the foregoing possible implementations, the configuration module 81 is further configured to: after the transceiver module 82 receives a first release request sent by the user plane gateway, release some or all services of the user plane gateway according to the first release request, and control the transceiver module 82 to return a first release response to the user plane gateway. The first release response is used to indicate that the control plane gateway completes release of the some or all services of the user plane gateway.

Optionally, based on any one of the foregoing possible implementations, the transceiver module 82 is further configured to:

send, under the control of the configuration module 81, a second release request to the user plane gateway, and receive a second release response returned by the user plane gateway. The second release request is used to instruct the user plane gateway to release some or all services, and the second release response is used to indicate that the user plane gateway completes release of the some or all services of the user plane gateway.

For the first release request and the second release request, refer to description in the embodiment shown in FIG. 3.

Figure 9:
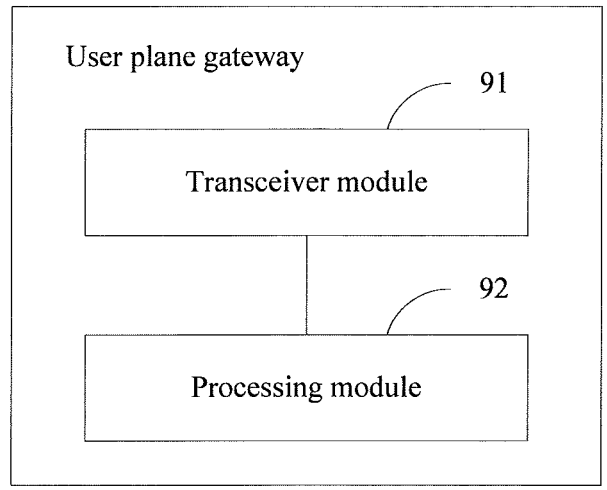
FIG. 9 is a schematic diagram of a user plane gateway according to an embodiment of this application.

Based on a same inventive concept, this application provides a user plane gateway, configured to perform steps performed by the user plane gateway in the foregoing method embodiments. For details, refer to related description in the embodiment shown in FIG. 4. Details are not described herein again. The user plane gateway is managed by a control plane gateway. As shown in FIG. 9, the user plane gateway includes:

a transceiver module 91, configured to receive a configuration message sent by the control plane gateway, where the configuration message carries a configuration parameter configured by the control plane gateway for the user plane gateway; and a processing module 92, configured to store the configuration parameter received by the transceiver module 91.

For the configuration parameter and the configuration message, refer to description in the embodiment shown in FIG. 3.

Optionally, the processing module 92 is further configured to control the transceiver module 91 to send a configuration request message to the control plane gateway. The configuration request message is used to request the control plane gateway to configure the parameter for the user plane gateway. For the configuration request message, refer to description in the embodiment shown in FIG. 3.

Optionally, the processing module 92 is further configured to control the transceiver module 91 to send a first update request to the control plane gateway, where the first update request carries information about the user plane gateway, and the information about the user plane gateway includes status information and/or capability information; or the processing module 92 is further configured to: after the transceiver module 91 receives a second update request sent by the control plane gateway, update stored information about the user plane gateway according to information carried in the second update request, where the second update request carries information about the user plane gateway, and the information about the user plane gateway includes status information and/or capability information.

For the first update request and the second update request, refer to description in the embodiment shown in FIG. 3.

Optionally, the transceiver module 91 is further configured to receive a first update response sent by the control plane gateway. The first update response includes at least one object, each object in the first update response includes at least one of the reconfigured configuration parameter and at least one atom action, and the at least one atom action is used to indicate an operation performed on a packet that matches the configuration parameter included in the object.

Optionally, based on any one of the foregoing implementations, the processing module 92 is further configured to control the transceiver module 91 to send a first release request to the control plane gateway, and the transceiver module 91 is further configured to receive a first release response returned by the control plane gateway, where the first release request is used to request the control plane gateway to release some or all services of the user plane gateway, and the first release response is used to indicate that the control plane gateway completes release of the some or all services of the user plane gateway; or the processing module 92 is further configured to: after the transceiver module 91 receives a second release request sent by the control plane gateway, release some or all services of the user plane gateway according to the second release request, and control the transceiver module to return a second release response to the control plane gateway, where the second release response is used to indicate that the user plane gateway completes release of the some or all services of the user plane gateway.

For the first release request and the second release request, refer to description in the embodiment shown in FIG. 3.

Figure 10:
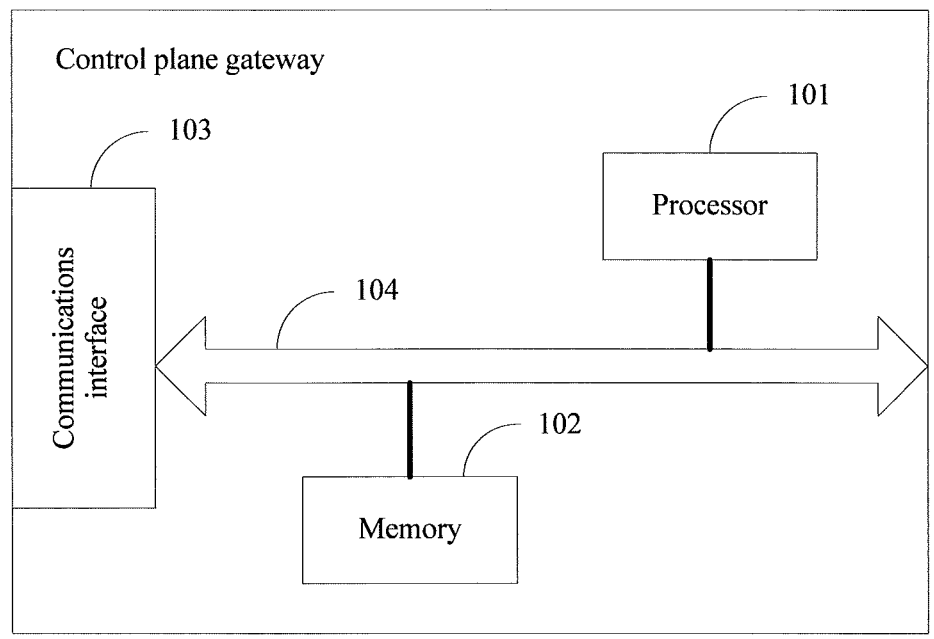
FIG. 10 is a schematic diagram of another control plane gateway according to an embodiment of this application.

Based on a same inventive concept, another control plane gateway provided in an embodiment may be configured to perform steps performed by the control plane gateway in the foregoing method embodiments. As shown in FIG. 10, the another control plane gateway may include:

a processor 101, a memory 102, a communications interface 103, and a system bus 104.

The processor 101 and the communications interface 103 are connected to each other and communicate with each other using the system bus 104. The processor 101 may be a central processing unit (CPU), an application-specific integrated circuit (ASIC), or one or more integrated circuits configured to implement this embodiment of this application.

The communications interface 103 is configured to interact, under the control of the processor 101, with another communications device.

The memory 102 may store data used by the processor 101 when an operation is performed.

When the control plane gateway runs, the processor 101 reads a program in the memory 102, to implement a function of the configuration module 81 in the embodiment shown in FIG. 8. The communications interface 103 implements, under the control of the processor 101, a function of the transceiver module 82 in the embodiment shown in FIG. 8. For details, refer to related description in the embodiment shown in FIG. 8. Details are not described herein again.

Figure 11:
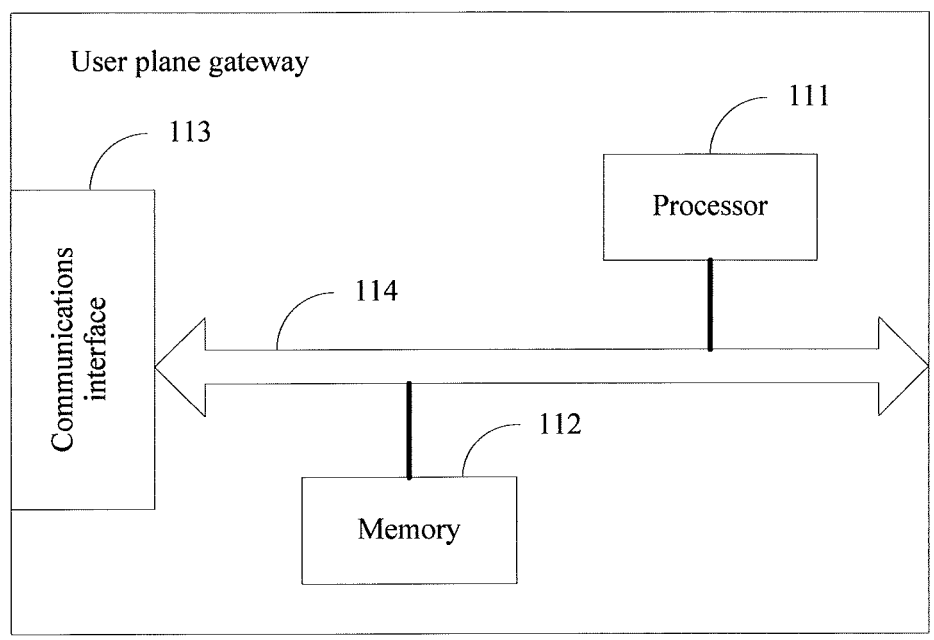
FIG. 11 is a schematic diagram of another user plane gateway according to an embodiment of this application.

Based on a same inventive concept, another user plane gateway provided in an embodiment may be configured to perform steps performed by the user plane gateway in the foregoing method embodiments. As shown in FIG. 11, the another user plane gateway includes:

a processor 111, a memory 112, a communications interface 113, and a system bus 114.

The processor 111 and the communications interface 113 are connected to each other and communicate with each other using the system bus 114. The processor 111 may be a CPU, a specific ASIC, or one or more integrated circuits configured to implement this embodiment of this application.

The communications interface 113 is configured to interact, under the control of the processor 111, with another communications device.

The memory 112 may store data used by the processor 111 when the processor 111 performs an operation.

When the user plane gateway runs, the processor 111 reads a program in the memory 112, to implement a function of the processing module 92 in the embodiment shown in FIG. 9. The communications interface 113 implements, under the control of the processor 111, a function of the transceiver module 91 in the embodiment shown in FIG. 9. For details, refer to related description in the embodiment shown in FIG. 9. Details are not described herein again.

Persons skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the embodiments and all changes and modifications falling within the scope of this application.

Obviously, persons skilled in the art can make various modifications and variations to this application without departing from the scope of this application. This application is intended to cover these modifications and variations of this application provided that they fall within the scope of protection defined by the following claims and their equivalent technologies.

What is claimed is:

1. A control plane gateway, wherein the control plane gateway is configured to manage a user plane gateway, and the control plane gateway comprises: a processor, a memory, a communications interface, and a system bus, wherein the processor and the communications interface are connected to each other and communicate with each other using the system bus, and the processor executes a program in the memory to perform the steps:
   configuring a configuration parameter for the user plane gateway after the communications interface receives a configuration request message from the user plane gateway, wherein the configuration request message is used to request the control plane gateway to configure the configuration parameter for the user plane gateway; and
   sending a configuration message to the user plane gateway, wherein the configuration message carries the configuration parameter.

2. The control plane gateway according to claim 1, wherein the configuration parameter comprises at least one of the following:
   an identifier of the control plane gateway, an identifier of at least one communication link configured by the control plane gateway for the user plane gateway, a bandwidth capability corresponding to a communication link, an Internet Protocol (IP) address pool of user equipment served by the user plane gateway, a packet classification rule, a bandwidth management rule, or a congestion management rule.

3. The control plane gateway according to claim 1, wherein the configuration request message carries information about the user plane gateway, the information about the user plane gateway comprises status information and/or capability information of the user plane gateway, and the processor further executes the program to:
   configure the configuration parameter for the user plane gateway according to the information about the user plane gateway.

4. A control plane gateway, wherein the control plane gateway is configured to manage a user plane gateway, and the control plane gateway comprises: a processor, a memory, a communications interface, and a system bus, wherein the processor and the communications interface are connected to each other and communicate with each other using the system bus, and the processor executes a program in the memory to perform the steps:
   configuring a configuration parameter for the user plane gateway;
   sending a configuration message to the user plane gateway, wherein the configuration message carries the configuration parameter; and
   after the communications interface receives a first update request from the user plane gateway, updating stored information about the user plane gateway, wherein the first update request carries the information about the user plane gateway, and the information about the user plane gateway comprises the status information and/or the capability information; or
   after the communications interface receives service information from a server, updating stored information about the user plane gateway according to the service information, and control the communications interface to send a second update request to the user plane gateway, wherein the second update request carries the information about the user plane gateway, and the information about the user plane gateway comprises the status information and/or the capability information.

5. A user plane gateway, wherein the user plane gateway is managed by a control plane gateway, and the user plane gateway comprises: a processor, a memory, a communications interface, and a system bus, wherein the processor and the communications interface are connected to each other and communicate with each other using the system bus, and the processor executes a program in the memory to perform the steps:
   receiving a configuration message from the control plane gateway, wherein the configuration message carries a configuration parameter configured by the control plane gateway for the user plane gateway; and
   storing the configuration parameter received by the communications interface; and
   controlling the communications interface to send a configuration request message to the control plane gateway, wherein the configuration request message is used to request the control plane gateway to configure the configuration parameter for the user plane gateway.

6. The user plane gateway according to claim 5, wherein the configuration parameter comprises at least one of the following:
   an identifier of the control plane gateway, an identifier of at least one communication link configured by the control plane gateway for the user plane gateway, a bandwidth capability corresponding to a communication link, an Internet Protocol (IP) address pool of user equipment served by the user plane gateway, a packet classification rule, a bandwidth management rule, or a congestion management rule.

7. The user plane gateway according to claim 5, wherein the configuration request message carries information about the user plane gateway, and the information about the user plane gateway comprises status information and/or capability information.

8. A user plane gateway, wherein the user plane gateway is managed by a control plane gateway, and the user plane gateway comprises: a processor, a memory, a communications interface, and a system bus, wherein the processor and the communications interface are connected to each other and communicate with each other using the system bus, and the processor executes a program in the memory to perform the steps:
   receiving a configuration message from the control plane gateway, wherein the configuration message carries a configuration parameter configured by the control plane gateway for the user plane gateway; and storing the configuration parameter received by the communications interface; and controlling the communications interface to send a first update request to the control plane gateway, wherein the first update request carries the information about the user plane gateway, and the information about the user plane gateway comprises the status information and/or the capability information; or after the communications interface receives a second update request from the control plane gateway, updating stored information about the user plane gateway according to information carried in the second update request, wherein the second update request carries the information about the user plane gateway, and the information about the user plane gateway comprises the status information and/or the capability information.

9. A gateway configuration method, wherein the method is applied in a communications system, the communications system comprises a control plane gateway and a user plane gateway, the control plane gateway is configured to manage the user plane gateway, and the method comprises:

configuring, by the control plane gateway, a configuration parameter for the user plane gateway after receiving a configuration request message from the user plane gateway, wherein the configuration request message is used to request the control plane gateway to configure the configuration parameter for the user plane gateway; and sending, by the control plane gateway, a configuration message to the user plane gateway, wherein the configuration message carries the configuration parameter.

10. The method according to claim 9, wherein the configuration parameter comprises at least one of the following:

an identifier of the control plane gateway, an identifier of at least one communication link configured by the control plane gateway for the user plane gateway, a bandwidth capability corresponding to a communication link, an Internet Protocol (IP) address pool of user equipment served by the user plane gateway, a packet classification rule, a bandwidth management rule, or a congestion management rule.

11. The method according to claim 9, wherein after the sending, by the control plane gateway, a configuration message to the user plane gateway, the method further comprises:

receiving, by the control plane gateway, a first update request from the user plane gateway, and updating stored information about the user plane gateway, wherein the first update request carries the information about the user plane gateway, and the information about the user plane gateway comprises the status information and/or the capability information; or receiving, by the control plane gateway, service information from a server, updating stored information about the user plane gateway according to the service information, and sending a second update request to the user plane gateway, wherein the second update request carries the information about the user plane gateway, and the information about the user plane gateway comprises the status information and/or the capability information.

12. A gateway configuration method, wherein the method is applied in a communications system, the communications system comprises a control plane gateway and a user plane gateway, the control plane gateway is configured to manage the user plane gateway, and the method comprises:

receiving, by the user plane gateway, a configuration message from the control plane gateway, wherein the configuration message carries a configuration parameter configured by the control plane gateway for the user plane gateway; and storing, by the user plane gateway, the configuration parameter;

wherein before the receiving, by the user plane gateway, the configuration message from the control plane gateway, the method further comprises:

sending, by the user plane gateway, a configuration request message to the control plane gateway, wherein the configuration request message is used to request the control plane gateway to configure the configuration parameter for the user plane gateway.

13. The method according to claim 12, wherein the configuration parameter comprises at least one of the following:

an identifier of the control plane gateway, an identifier of at least one communication link configured by the control plane gateway for the user plane gateway, a bandwidth capability corresponding to a communication link, an Internet Protocol IP address pool of user equipment served by the user plane gateway, a packet classification rule, a bandwidth management rule, or a congestion management rule.

14. A gateway configuration method, wherein the method is applied in a communications system, the communications system comprises a control plane gateway and a user plane gateway, the control plane gateway is configured to manage the user plane gateway, and the method comprises:

receiving, by the user plane gateway, a configuration message from the control plane gateway, wherein the configuration message carries a configuration parameter configured by the control plane gateway for the user plane gateway; and storing, by the user plane gateway, the configuration parameter wherein after the receiving, by the user plane gateway, the configuration message from the control plane gateway, the method further comprises:

sending, by the user plane gateway, a first update request to the control plane gateway, wherein the first update request carries the information about the user plane gateway, and the information about the user plane gateway comprises the status information and/or the capability information; or receiving, by the user plane gateway, a second update request from the control plane gateway, and updating stored information about the user plane gateway according to information carried in the second update request, wherein the second update request carries the information about the user plane gateway, and the information about the user plane gateway comprises the status information and/or the capability information.

15. The method according to claim 14, wherein the method further comprises:

receiving, by the user plane gateway, a first update response from the control plane gateway, wherein the first update response comprises at least one object, each object in the first update response comprises at least one of the configuration parameter and at least one atom action, and the at least one atom action is used to indicate an operation performed on a packet that matches the configuration parameter comprised in the object.

16. A gateway configuration method, wherein the method is applied in a communications system, the communications system comprises a control plane gateway and a user plane gateway, the control plane gateway is configured to manage the user plane gateway, and the method comprises:

receiving, by the user plane gateway, a configuration message from the control plane gateway, wherein the configuration message carries a configuration parameter configured by the control plane gateway for the user plane gateway; and storing, by the user plane gateway, the configuration parameter wherein after the receiving, by the user plane gateway, the configuration message sent by the control plane gateway, the method further comprises:

sending, by the user plane gateway, a first release request to the control plane gateway, and receiving a first release response returned by the control plane gateway, wherein the first release request is used to request the control plane gateway to release some or all services of the user plane gateway, and the first release response is used to indicate that the control plane gateway completes release of the some or all services of the user plane gateway; or receiving, by the user plane gateway, a second release request from the control plane gateway, releasing some or all services of the user plane gateway according to the second release request, and returning a second release response to the control plane gateway, wherein the second release response is used to indicate that the user plane gateway completes release of the some or all services of the user plane gateway.

\* \* \* \* \*